United States Patent
Feringa et al.

(10) Patent No.: US 12,410,319 B2
(45) Date of Patent: Sep. 9, 2025

(54) RADIATION-CURABLE COATING COMPOSITION, METHOD OF COATING A SUBSTRATE AND COATED SUBSTRATE

(71) Applicant: Akzo Nobel Coatings International B.V., Amsterdam (NL)

(72) Inventors: Bernard Lucas Feringa, Groningen (NL); Johannes George Hendrik Hermens, Groningen (NL); Keimpe Jan Van Den Berg, Amsterdam (NL); Rogier Van Gemert, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 491 days.

(21) Appl. No.: 18/009,882

(22) PCT Filed: Jun. 21, 2021

(86) PCT No.: PCT/EP2021/066734
§ 371 (c)(1),
(2) Date: Dec. 12, 2022

(87) PCT Pub. No.: WO2021/259819
PCT Pub. Date: Dec. 30, 2021

(65) Prior Publication Data
US 2023/0279236 A1 Sep. 7, 2023

(30) Foreign Application Priority Data
Jun. 23, 2020 (EP) .................................... 20181674

(51) Int. Cl.
*C09D 4/00* (2006.01)
*C08F 216/12* (2006.01)
*C08F 234/02* (2006.01)

(52) U.S. Cl.
CPC ............ *C09D 4/00* (2013.01); *C08F 216/125* (2013.01); *C08F 234/02* (2013.01)

(58) Field of Classification Search
CPC .......... C09D 4/00; C08F 216/12; C08F 234/02
USPC .......................................................... 524/549
See application file for complete search history.

(56) References Cited

U.S. PATENT DOCUMENTS

| | | | |
|---|---|---|---|
| 4,954,593 A | 9/1990 | Vara et al. | |
| 2009/0069504 A1* | 3/2009 | Stopek | A61L 17/12 525/411 |

FOREIGN PATENT DOCUMENTS

| | | |
|---|---|---|
| JP | 2003335826 A | 11/2003 |
| WO | WO2008/144247 A1 | 11/2008 |

OTHER PUBLICATIONS

"International Preliminary Report on Patentability," for PCT Application No. PCT/EP2021/066734 mailed Dec. 13, 2022 (6 pages).
English Transalation of JP2003335826A.
V.V. Poskonin et al., Studies on Substituted Butane- and Butenolides; XIV.[+] Synthesis of High-Molecular . . . , Russian Journal of Organic Chemistry,vol. 35, pp. 721-726.
Johannes Cornelis de Jong, Asymmetric Diels-Alder Reactions with 5-Menthyloxy-2(5H)-Furanones, Thesis University of Groningen, 2006, pp. 17-29.
V.V. Poskonin et al., Studies on Substituted Butane- and Butenolides. XIII.[+] Synthesis of Copolymers . . . , Russian Journal Chemistry,vol. 33, No. 4, pp. 520-523.
Barry M. Trost et al., Palladium Catalyzed Kinetic and Dynamic Kinetic Asymmetric Transformations of γ-Acyloxybutenolides . . . J. Am. Chem. Soc. 2003, 125, pp. 3090-3100.
European Search Report of Corresponding Application No. EP 20181674.1, dated Nov. 20, 2020.
International Search Report and Written Opinion of Corresponding Application No. PCT/EP2021/066734, mailed Sep. 22, 2021.

* cited by examiner

*Primary Examiner* — Deve V Hall
(74) *Attorney, Agent, or Firm* — Pauly, DeVries Smith & Deffner LLC

(57) ABSTRACT

A radiation-curable coating composition is provided comprising a 5-hydroxy or 5-alkoxy-2 (5H)-furanone compound A, and a compound B with two or more vinyl ether or vinyl ester groups, wherein the molar ratio of vinyl moieties in compound B and furanone moieties in compound A is at least 0.5, and wherein the coating composition is free of a compound with two or more acryloyl or methacryloyl groups. Also provided are a method of coating a substrate comprising applying such coating composition to a substrate and radiation-curing the coating composition to form a cured coating, and a coated substrate obtainable by such method.

15 Claims, No Drawings

RADIATION-CURABLE COATING COMPOSITION, METHOD OF COATING A SUBSTRATE AND COATED SUBSTRATE

CROSS-REFERENCE TO RELATED APPLICATIONS

This application is a 35 U.S.C. § 371 national phase application of PCT Application No. PCT/EP2021/066734 (WO 2021/259819 A1), filed on Jun. 21, 2021, which claims priority to EP Application Serial No. 20181674.1, filed on Jun. 23, 2020, each of which is incorporated herein by reference in its entirety.

FIELD OF THE INVENTION

The present invention relates to a radiation-curable coating composition, a method of coating a substrate comprising applying and curing such coating composition, and a coated substrate obtainable by such method.

BACKGROUND OF THE INVENTION

Radiation-curable coating compositions containing double bonds that can be activated by actinic radiation, such as UV light or electron beam radiation, are well known in the art. Reference herein to actinic radiation is to electromagnetic, ionizing radiation, in particular electron beam radiation, UV light and visible light. Radiation-curable coating compositions typically cross-link through radical polymerization of monomers with an ethylenically unsaturated group, such as an acryloyl, methacryloyl, or vinyl group. Examples of such monomers include acrylic acid, methacrylic acid, alkyl esters of (meth)acrylic acid, styrene, alkyl-substituted styrene, vinyl esters, and vinyl ethers. The monomers are usually prepared from petrochemical raw materials.

There is an increasing demand for chemical products prepared from renewable feedstock. Binder polymers at least partly prepared from renewable feedstock are known in the art. Alkyd resins for example comprise a relatively high content of fatty acids obtained from vegetable oil.

In U.S. Pat. No. 4,954,593 is disclosed a copolymer for use as a protective coating that is prepared by combining a furanone monomer and a vinyl ether monomer in a molar ratio of about one. The copolymer may be prepared by photopolymerization or by solution polymerization in the presence of a free-radical initiator.

Furanones are ethylenically unsaturated furanoic compounds that can be prepared from carbohydrates, i.e. a renewable feedstock. Carbohydrate feedstock such as starch, cellulose or carbohydrate-containing bio-waste can be converted into furfural, hydroxymethylfurfural, or related furan derivatives by dehydration and can then be oxidized into furanones. Preparation of alkoxylated furanones is for example described in Chapter II of J. C. de Jong, Asymmetric Diels-Alder reactions with 5-menthyloxy-2(5H)-furanones, Thesis University of Groningen, 2006, accessible via https://www.rug.nl/research/portal/en/publications/asymmetric-dielsalder-reactions-with-5menthyloxy25hfuranones(f0ab6c00-8c6c-4ccc-90aa-3ef05f759fa4).html.

Poskonin et al. have disclosed in *Russian Journal of Organic Chemistry* 35 (1999) 721-726 copolymers prepared by radical polymerization of 5-alkoxy-2(5H)-furanone and styrene, methyl methacrylate, or vinyl acetate. Use of such copolymers for synthesis of physiologically active substances is suggested.

There is a need for radiation-curable coating compositions that can at least partially be obtained from renewable feedstock.

SUMMARY OF THE INVENTION

It has now been found that a hard and chemically resistant cured coating can be obtained by radiation curing, activated by actinic radiation such as visible or UV light or electron beam radiation, of a composition comprising 5-hydroxy or 5-alkoxy-2(5H)-furanone monomers or 5-alkoxy-2(5H)-furanone oligomers and a compound with two or more vinyl ether or vinyl ester groups. The coatings formed have properties that make them suitable as protective or decorative coatings.

Accordingly, the invention provides in a first aspect a radiation-curable coating composition comprising:

A a 5-substituted-2(5H)-furanone compound of general formula (I)

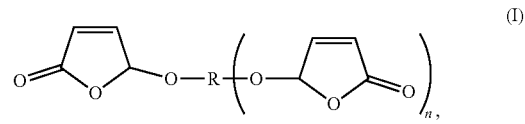

wherein n is 0 or an integer with a value in the range of from 1 to 5, and wherein, if n is 0, R is a hydrogen atom or an organic group comprising in the range of from 1 to 40 carbon atoms, and, if n is an integer with a value in the range of from 1 to 5, R is an organic group comprising in the range of from 1 to 40 carbon atoms; and B a compound with two or more vinyl ether or vinyl ester groups, wherein the molar ratio of vinyl moieties in compound B and furanone moieties in compound A is at least 0.5, and wherein the coating composition is free of a compound with two or more acryloyl or methacryloyl groups.

It is an advantage of the coating composition according to the invention that it can be formulated without organic solvent or with only a small amount of organic solvent, typically less than 20 wt %.

In a second aspect, the invention provides a method of coating a substrate comprising:
providing a substrate
applying a coating composition according to the first aspect of the invention to the substrate; and
radiation-curing the coating composition to form a cured coating.

The coating composition of the present disclosure and the cured coating formed from it has a relatively high content of furanone, a bio-based material.

The binder polymer formed upon curing has a polymer backbone with acetal functionality, which advantageously provides possibilities for further crosslinking or modification of the coating, for example with a hydroxyl or thiol functional crosslinker or with a polymer with hydroxyl or thiol functionality.

In a final aspect, the invention provides a coated substrate obtainable by a method according to the second aspect of the invention.

DETAILED DESCRIPTION OF THE INVENTION

The coating composition according to the invention comprises a 5-substituted-2(5H)-furanone compound A and a compound B with two or more vinyl ether or vinyl ester groups.

Compound A is a 5-substituted-2(5H)-furanone compound of general formula (I)

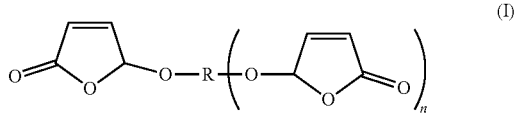

wherein n is 0 or an integer with a value in the range of from 1 to 5, and wherein, if n is 0, R is a hydrogen atom or an organic group comprising in the range of from 1 to 40 carbon atoms, and if n is an integer with a value in the range of from 1 to 5, R is an organic group comprising in the range of from 1 to 40 carbon atoms.

R may be a hydrocarbon group, i.e. a group with only carbon and hydrogen atoms, or an organic group with carbon and hydrogen atoms and heteroatoms. Preferably, R is a hydrocarbon group or a polyether moiety, more preferably a saturated hydrocarbon group.

Preferably, n is 0. If n is 0, compound A is 5-hydroxy-2(5H)-furanone (R is a hydrogen atom), or a 5-alkoxy-2(5H)-furanone monomer with a single furanone moiety. If n is 0, R is preferably a hydrogen atom or an alkyl radical, more preferably a hydrogen atom or an alkyl radical containing in the range of from 1 to 12 carbon atoms. Examples of suitable alkyl radials are methyl, ethyl, n-propyl, isopropyl, n-butyl, tert-butyl, sec-butyl, isobutyl, hexyl, menthyl (2-isopropyl-5-methylcyclohexan-1-yl). More preferably, R is an alkyl radical containing in the range of from 1 to 6 carbon atoms. 5-Methoxy-2(5H)-furanone, 5-hexyloxy-2(5H)-furanone, and 5-isopropyloxy-2(5H)-furanone are particularly preferred compounds A. The R group may be chosen to tune the properties of the polymer formed, for example the glass transition temperature of the polymer, and therewith the properties of the cured coating.

If n is an integer with a value in the range of from 1 to 5, compound A is an oligomer obtainable by reacting a polyol having in the range of from 2 to 6 hydroxyl groups with 5-hydroxy-2(5H)-furanone, wherein the polyol has in the range of from 1 to 40 carbon atoms.

Examples of suitable polyols include diols such as ethylene glycol, propylene glycol, butylene glycol, isosorbide, 1,3-propanediol, 1,4-butanediol, 1,5-pentanediol, 1,6-hexanediol, polyethylene glycol, polypropylene glycol, cyclohexanedimethanol, 2,2,4,4-tetramethyl-1,3-cyclobutanediol, tricyclodecane dimethanol, dimer fatty acid-based diols like Pripol 2033 (a C36 aliphatic diol); triols such as glycerol, trimethylolpropane, trimethylolethane, and 1,3,5-tris(2-hydroxyethyl)isocyanurate, tetraols such as pentaerythritol and di-trimethylolpropane; and hexols such as dipentaerythritol.

Preferably the coating composition is free of any furanone compounds other than compound A.

Compound B is a compound with two or more vinyl ether groups, vinyl ester groups, or a combination thereof, preferably two or three of such groups, more preferably two of such groups. Preferably, compound B does not comprise vinyl groups other than vinyl ether groups or vinyl ester groups.

Compound B may be a combination of two or more compounds comprising two or more vinyl ether groups or vinyl ester groups, preferably compound B is a single compound.

Examples of suitable compounds with vinyl ester groups include malonic acid divinyl ester, adipic acid divinyl ester, fumaric acid divinyl ester, sebacic acid divinyl ester, phthalic acid divinyl ester, and trimellitic acid trivinyl ester.

Preferably, compound B is a compound with two or more vinyl ether groups, more preferably two or three vinyl ether groups. Examples of suitable compounds with two or three vinyl ether groups include divinyl ethers or trivinyl ethers of (poly)ethylene glycol or (poly)propylene glycol such as ethylene glycol divinyl ether, diethylene glycol divinyl ether, triethylene glycol divinyl ether, tetraethylene glycol divinyl ether, propylene glycol divinyl ether, dipropylene glycol divinyl ether, tripropylene glycol divinyl ether, tetrapropylene glycol divinyl ether; butanediol divinyl ether; hexanediol divinyl ether; 1,4-cyclohexanedimethanol divinyl ether; and trimethylol propane trivinyl ether.

Compound B may be a compound with a polymeric backbone and two or more vinyl ether groups, preferably a polyurethane, polyester-urethane, polyether-urethane, poly(meth)acrylate-urethane, or polyester with two or more vinyl ether groups. Such compounds may for example be prepared by reacting an isocyanate with a hydroxyl functional vinyl ether and a hydroxyl functional polyester, polyether or poly(meth)acrylate. A polyester with two or more vinyl ether groups can be prepared via a transesterification of a hydroxyl functional vinyl ether with a polyester with two or more ester groups of alcohols with a relative low boiling point. By using in the coating composition such compound with a polymeric backbone, the properties of the cured coating, in particular mechanical properties, can be tuned by the choice of the backbone.

Compound B preferably has a molecular weight in the range of from 100 to 3,000 g/mol. If compound B is a compound with a polymeric backbone as described above, the molecular weight is preferably in the range of from 500 to 3,000 g/mol.

The relative amounts of compounds A and B in the coating composition are such that the molar ratio of vinyl moieties in compound B and furanone moieties in compound A is at least 0.5. At a lower molar ratio, the degree of crosslinking in the polymer formed will be low, resulting in inferior film properties.

The coating composition may comprise a further compound C with one vinyl group. Reference herein to a vinyl group is to a group of general formula $CH_2=CH-$. The vinyl group may be a vinyl ether group, a vinyl ester group, an acryloyl group, a methacryloyl group, or other vinyl group. Monovinyl compound C may act as a reactive diluent, may control the degree of crosslinking of the cured polymer, or may control the glass transition temperature of the cured polymer.

Examples of suitable monovinyl compounds C include acrylic acid, methacrylic acid, alkyl esters of (meth)acrylic acid, styrene and styrene derivates, methylene malonates, itaconic acid, monovinyl ethers, and/or a monovinyl esters. Examples of suitable monovinyl ethers include n-butyl vinyl ether, iso-butyl vinyl ether, cyclohexyl vinyl ether, phenyl vinyl ether, 2-ethylhexyl vinyl ether, n-dodecyl vinyl ether, octadecyl vinyl ether, 4-hydroxybutyl vinyl ether. Examples of suitable monovinyl esters include vinyl neodecanoate, vinyl neononanoate, vinyl decanoate, and/or vinyl acetate.

Preferably, compound C is a monovinyl ester, a monovinyl ether, and/or a (meth)acryloyl monomer with a molecular weight in the range of from 50 to 800 g/mol, more preferably of from 100 to 500 g/mol.

The molar ratio of furanone moieties and vinyl moieties in the coating composition is preferably in the range of from 1.5 to 1.0 to 1.0 to 1.5, more preferably of from 1.2 to 1.0 to 1.0 to 1.2. Vinyl moieties are present in compound B and in optional compound C. Preferably, the coating composition does not comprise any compounds with vinyl moieties other than compounds B and C.

Preferably, if compound C is present, the molar ratio of vinyl moieties in compound C and furanone moieties in compound A is less than 1.0, more preferably less than 0.5.

The coating composition is free of a compound with two or more acryloyl or methacryloyl groups. It has found that the presence of such compound has a negative effect on film formation.

The total amount of compounds A and B and optional compound C in the coating composition is preferably in the range of from 70 to 100 wt %, more preferably of from 80 to 100 wt %, even more preferably of from 90 to 100 wt %.

The coating composition is radiation-curable. The coating composition may be cured by photoinitiation, i.e. by radiation with visible light or UV light. In order to be curable by photoinitiation, the coating composition comprises a photo-initiator D.

Photo-initiator D may be one photo initiator or a mixture of two or more thereof. Photo-initiators generate free radicals when exposed to radiation energy in the visible light or UV light wavelength range. Any suitable photo-initiator known in the art may be used, depending on the wavelength. Suitable photo-initiators include benzoin derivatives, benzile ketales, α-hydroxyalkylphenones, monoacylphosphine oxide (MAPO) and bisacylphosphine oxides (BAPO), such as diphenyl(2,4,6-trimethylbenzoyl)phosphine oxide, 1-hydroxy-cyclohexyl-phenyl-ketone, bis(2,4,6-trimethylbenzoyl)-phenylphosphineoxide, bis(2,6-dimethoxybenzoyl)-2,4,4-trimethylpentyl-phosphine oxide, 2-hydroxy-2-methyl-1-phenyl-propan-1-one, 2-methyl-1[4-(methylthio)phenyl]-2-morpholono-propan-1-one, a phenyl glyoxylic acid methyl ester. Mixtures of these compounds may also be employed.

The photo-initiator is preferably present in an amount of from 0.1 to 10 wt %, for example of from 0.5 to 5.0 wt %, based on the total weight of the coating composition.

Alternatively, the curing of the coating composition may be initiated by electron beam or by gamma radiation. For initiation by electron beam or gamma radiation, no photo-initiator is needed.

The coating composition may be a powder coating composition or a liquid coating composition, preferably a liquid coating composition. The coating composition preferably is an essentially solvent-free liquid coating composition. Reference herein to an essentially solvent-free coating composition is to a coating composition comprising at most 1 wt % of organic solvent, more preferably at most 0.5 wt %, still more preferably 0 wt %.

In case the viscosity of the combined compounds A, B, and optionally C is undesirably high, the coating composition may comprise some organic solvent to control the viscosity. Preferably, the coating composition comprises at most 30 wt % organic solvent, more preferably at most 20 wt %, even more preferably at most 10 wt %, still more preferably at most 5 wt % or at most 2 wt %.

Suitable organic solvents are solvents in which compounds A, B, C, and the cured polymer dissolve at polymerization conditions. Preferably, the organic solvent is an oxygenated organic solvent such as for example an alcohol, glycol ether, glycol ester, alkyl acetate, ketone, ester, or glycol ether/ester. More preferably, the solvent is a glycol ether or an alkyl acetate. 1-Methoxy-2-propanol and butyl acetate are particularly preferred solvents.

The coating composition is not a waterborne coating composition, i.e. water is not the liquid medium in which compounds A, B, and optionally compound C, are dissolved or dispersed. The coating composition may comprise a small amount of water, for example water that is contained in additives comprised in the coating composition. Preferably, the coating composition comprises less than 5 wt % water, more preferably less than 1 wt %.

The coating composition may comprise further ingredients commonly used in coating compositions such as color pigments, extender pigments, and one or more additives such as for example light stabilizers, other stabilizers, defoaming agents, matting agents, wetting agents, or flow agents.

The invention further provides a method of coating a substrate, comprising providing a substrate, applying the coating composition according to the first aspect of the invention to the substrate, and radiation-curing the coating composition, preferably by exposing the coating composition to visible light or UV radiation, electron beam radiation, or gamma radiation, to form a cured coating.

The coating composition may be applied to the substrate by conventional techniques, including spraying, rolling, blade-coating, pouring, brushing or dipping. After evaporation of any organic solvent and/or water, if present, the coating composition results in a coating that is dust-dry to slightly tacky. Curing is then induced by means of radiation. Any suitable source of radiation can be used. Electron beam radiation, UV radiation and visible light radiation are preferred.

In one embodiment, the coating composition comprises a photo-initiator D and the coating composition is cured by exposing the coating composition to visible light or UV radiation, preferably to visible light with a wavelength in the range of from 400 to 600 nm or to UV radiation with a wavelength in the range of from 200 to 400 nm, more preferably to UV radiation with a wavelength in the range of from 280 to 400 nm, even more preferably of from 320 to 400 nm (UV-A radiation).

For UV radiation, Hg lamps, metal halide lamps, xenon lamps, or UV-LED lamps may for example be used. It is preferred to use UV-LED lamps.

Radiation curing of the coating composition can be done at ambient conditions, e.g. room temperature and atmospheric pressure. Reference herein to room temperature is to a temperature in the range of from 15 to 30° C. The curing may be accelerated by post-heating, for example post-heating to a temperature in the range of from 40 to 100° C., preferably of from 50 to 80° C.

The substrate may be any suitable substrate, such as for example wood, polymer, composite, metal, glass, or other mineral substrate. The substrate may be a primed or bare substrate.

The coating composition according to the present invention can be used as a single layer applied directly to the substrate, or in multilayer systems, e.g. as a primer, a basecoat, a clearcoat, or a topcoat.

The coating composition according to the present invention can be used for various applications, such as coating of wood, electronic appliances, plastic automotive components, food can, or as architectural coating.

In a final aspect, the invention provides a coated substrate obtainable by a method according to the second aspect of the invention.

The invention is further illustrated by means of the following non-limiting examples.

EXAMPLES

The following furanone compounds were used:

| | |
|---|---|
| 5-methoxy-2(5H)-furanone | methoxy |
| 5-methyl-5-methoxy-2(5H)-furanone | methoxy-methyl |
| 2(5H)-furanone | 2-furanone |
| 5-hexyloxy-2(5H)-furanone | hexyloxy |
| 5-isopropyloxy-2(5H)-furanone | isopropyloxy |

The following di-functional vinyl compounds were used:

| | |
|---|---|
| diethylene glycol divinyl ether | DEGDVE |
| 1,6-hexanediol diacrylate | 1,6-HDDA |
| tripropyleneglycol diacrylate | TPGDA |
| urethane oligomer with two acryloyl groups (Ebecryl 8409 ex. Allnex) | Ebecryl |

The following mono-functional vinyl compounds were used:

| | |
|---|---|
| vinyl neodecanoate (ex. Hexion) | VeoVa 10 |
| vinyl neononanoate (ex. Hexion) | VeoVa 9 |
| 2-ethylhexyl acrylate | 2-EHA |

Coating compositions were prepared by combining a furanone compound with a difunctional and/or monofunctional vinyl compound as indicated in Table 1 and adding 3 wt % bis(2,4,6-trimethylbenzoyl)phenylphosphine oxide (Omnirad 819) as photo-initiator. All compositions except compositions 8 and I were solvent-free compositions (100% solids). Composition 8 comprised 23 wt % butyl acetate and composition I comprised 10 wt % butyl acetate as solvent. Compositions 1 to 9 are coating compositions according to the invention; compositions A to J are comparison compositions. A 100 µm wet film of coating composition was drawn on a glass plate using a drawing bar. The wet film was cured by irradiating the film with UV light using a UV-A LED irradiation device (ex. SemiLEDs Corporation) with 12 LED lamps emitting UV light with a wavelength of 395 nm and a total irradiance of 4.5 mW/cm$^2$ during 5 minutes at a distance of 10 cm.

The UV-cured coating thus obtained was tested as described below for water resistance and solvent resistance and for hardness, after 4 days of storing at 23° C. and 50% relative humidity.

Water Resistance

A droplet of demineralized water was put on the cured coating and covered by a watch glass. After 60 minutes, the water droplet was wiped off and the effect on the coating was determined visually on a scale of 0 to 5, wherein 5 means that the water droplet has no visible impact on the coating, and 0 means that the water droplet has a detrimental impact.

Solvent Resistance (Methyl Ethyl Ketone)

A droplet of methyl ethyl ketone was put on the cured coating. After 30 seconds, the methyl ethyl ketone droplet was wiped off and the effect on the coating was determined visually on a scale of 0 to 5, wherein 5 means that the solvent droplet has no visible impact on the coating, and 0 means that the solvent droplet has a detrimental impact.

Hardness (Persoz)

Pendulum hardness (Persoz hardness) of the cured coating was determined according to ISO 1522. The number of pendulum swings for the amplitude of the pendulum to decrease from 12 to 4 degrees was determined.

Glass Transition Temperature

The glass transition temperature Tg of a cured coating from compositions 3, 6, and 9 was determined as follows. A 100 µm wet film of coating composition was drawn on a polypropylene panel using a drawing bar. The wet film was cured by irradiating the film with UV light using a UV-A LED irradiation device (ex. SemiLEDs Corporation) with 12 LED lamps emitting UV light with a wavelength of 395 nm and a total irradiance of 4.5 mW/cm$^2$ during 5 minutes at a distance of 10 cm. The cured coating was then removed from the panel. A rectangular strip (6.0×30.0 mm) of free coating film was stored for 16 hours at 23° at 50% relative humidity and then subjected to Dynamic Mechanical Thermal Analysis (DMTA) in tension mode according to ISO 6721-11, using a TA Instruments RSA3 dynamic mechanical analyzer. The oscillation frequency was 10 rad/s, the temperature of the sample was increased from 20° C. to 200° C. with temperature increments of 5.0° C. The changes in viscoelastic response as a function of the test temperature were recorded. The temperature at the peak in the loss factor versus test temperature curve (tan delta curve) is taken as the glass transition temperature.

The properties of the cured coatings are shown in Table 1.

The coating compositions according to the invention all formed a coating film that was tack-free within hours, with good water resistance and solvent resistance and acceptable hardness for many coating applications.

The presence of a compound with two acryloyl groups had a negative effect on film formation (see comparison examples E, F, I, and J). Wrinkled films or films that were wet and tacky, even after days of drying, were formed.

TABLE 1

Coating compositions and film properties

| | furanone | Divinyl | Monovinyl | Molar ratio | water resist | MEK resist | Hardness | Tg ° C. |
|---|---|---|---|---|---|---|---|---|
| 1 | methoxy | DEGDVE | — | 2:1 | 5 | 4 | 254 | |
| 2 | methoxy | DEGDVE | VeoVa10 | 2:0.9:0.2 | 5 | 4 | 247 | |
| 3 | methoxy | DEGDVE | VeoVa10 | 2:0.7:0.6 | 5 | 4 | 218 | 156 |
| 4 | methoxy | DEGDVE | VeoVa10 | 2:0.8:0.4 | 5 | 4 | 208 | |
| 5 | methoxy | DEGDVE | 2-EHA | 2:0.7:0.6 | 5 | 3 | 124 | |

TABLE 1-continued

Coating compositions and film properties

| | furanone | Divinyl | Monovinyl | Molar ratio | water resist | MEK resist | Hardness | Tg °C. |
|---|---|---|---|---|---|---|---|---|
| 6 | hexyloxy | DEGDVE | — | 2:1 | 5 | 4-5 | 145 | 86 |
| 7 | isopropyloxy | DEGDVE | — | 2:1 | 5 | 4 | 241 | |
| 8 | 5-mentholoxy | DEGDVE | — | 2:1 | 5 | 4 | 261 | |
| 9 | isopropyloxy | DEGDVE | VeoVa10 | 2:0.7:0.6 | 5 | 4 | 220 | 95 |
| A[1] | Methoxy-methyl | DEGDVE | — | 2:1 | n.d. | n.d. | n.d. | |
| B | methoxy | DEGDVE | VeoVa10 | 2:0.3:1.4 | 5 | 0 | 96 | |
| C | methoxy | none | VeoVa10 | 1:—:1 | 3 | 0 | 90 | |
| D | methoxy | none | VeoVa10/9 | 2:—:1/1 | 4 | 1 | 118 | |
| E[2] | methoxy | 1,6 HDDA | — | 2:1 | n.d. | n.d. | n.d | |
| F[3] | methoxy | TPGDA | — | 2:1 | n.d. | n.d. | n.d. | |
| G[4] | methoxy | none | 2-EHA | 1:—:1 | n.d. | n.d. | n.d. | |
| H | 2-furanone | DEGDVE | — | 2:1 | 2 | 2-3 | 215 | |
| I[5] | methoxy | DEGDVE + Ebecryl | — | 2:(0.7 + 0.3) | n.d. | n.d. | n.d. | |
| J[6] | methoxy | DEGDVE + Ebecryl | — | 2:(0.85 + 0.15) | n.d. | n.d. | n.d. | | n.d.: not determined
[1]Composition A: no polymerization reaction
[2]Composition E: a very bad film was formed:tacky, showing wrinkling and spot blistering
[3]Composition F: a very bad film was formed:tacky, showing wrinkling and spot blistering
[4]Composition G: a wet/tacky film was formed. NMR analysis of the film showed the presence of unreacted 5-methoxy-2(5H)-furanone
[5]Composition I: the film was wet and tacky, even after days of drying
[6]Composition J: the film was wet and tacky, even after days of drying The absence of a vinyl compound with two or more vinyl groups or a low amount of such compound (molar ratio of vinyl moieties in such vinyl compound to furanone moieties in compound A is below 0.5) resulted in insufficient hardness and insufficient solvent resistance (see comparison examples C, D, and B) or in unreacted furanone (comparison example G).

A furanone compound without hydroxy or alkoxy group on the 5-position resulted in a coating that cured much slower and had inferior water resistance and inferior chemical resistance (see comparison example H). A furanone compound with a further substituent on the 5-position did not react with divinyl compound B (see comparison example A).

The invention claimed is:

1. A radiation-curable coating composition comprising:
  a 5-substituted-2 (5H)-furanone compound A of general formula (I)

(I)

wherein n is 0 or an integer with a value in the range of from 1 to 5, and wherein,
  if n is 0, R is a hydrogen atom or an organic group comprising in the range of from 1 to 40 carbon atoms, and,
  if n is an integer with a value in the range of from 1 to 5, R is an organic group comprising in the range of from 1 to 40 carbon atoms; and
  a compound B with two or more vinyl ether or vinyl ester groups,
  wherein the molar ratio of vinyl moieties in compound B and furanone moieties in compound A is at least 0.5, and
  wherein the coating composition is free of a compound with two or more acryloyl or methacryloyl groups.

2. The coating composition according to claim 1, wherein n is 0.

3. The coating composition according to claim 2, wherein R is a hydrogen atom or an alkyl radical having 1 to 12 carbon atoms.

4. The coating composition according to claim 3, wherein the 5-substituted-2 (5H)-furanone compound is a 5-alkoxy-2 (5H)-furanone compound.

5. The coating composition according to claim 1, wherein compound B is a compound with two or three vinyl ether or vinyl ester groups.

6. The coating composition according to claim 1, wherein compound B is a compound with two or more vinyl ether groups.

7. The coating composition according to claim 6, wherein compound B is a compound with a polymeric backbone and two or more vinyl ether groups.

8. The coating composition according to claim 7, wherein the compound with a polymeric backbone and two or more vinyl ether groups has a molecular weight of 500 to 3,000 g/mol.

9. The coating composition according to claim 1, wherein the composition further comprises
  a compound C with one vinyl group.

10. The coating composition according to claim 9, wherein compound C is a monovinyl ester, a monovinyl ether, and/or a (meth)acryloyl monomer with a molecular weight of 50 to 500 g/mol.

11. The coating composition according to claim 1, wherein the molar ratio of furanone moieties and vinyl moieties is in the range of from 1.5:1.0 to 1.0:1.5.

12. The coating composition according to claim 1, wherein the composition further comprises
  a photo-initiator D.

13. A method of coating a substrate comprising:
  providing a substrate
  applying a coating composition according to claim 1 to the substrate; and radiation-curing the coating composition to form a cured coating.

14. The method according to claim 13, wherein the coating composition further comprises a photo-initiator D, and wherein the applied coating composition is cured by exposing it to photo-radiation.

15. A coated substrate obtainable by a method according to claim 13.

* * * * *